United States Patent

Atkinson

[15] 3,642,334
[45] Feb. 15, 1972

[54] ELECTROSTATIC SUPPORT SYSTEM

[72] Inventor: James L. Atkinson, La Mirada, Calif.
[73] Assignee: North American Rockwell Corporation
[22] Filed: June 29, 1970
[21] Appl. No.: 50,604

[52] U.S. Cl. ............................................308/10, 73/505
[51] Int. Cl. ..........................................F16c 39/06
[58] Field of Search ..............308/10; 73/505, 517; 415/160; 74/5

[56] References Cited

UNITED STATES PATENTS

| | | | |
|---|---|---|---|
| 3,262,326 | 7/1966 | Schott | 308/10 |
| 3,338,644 | 8/1967 | Atkinson | 308/10 |
| 3,411,838 | 11/1968 | Atkinson | 308/10 |
| 3,552,028 | 1/1971 | Simon | 73/517 |
| 3,495,465 | 2/1970 | Nordsieck | 74/5 |

*Primary Examiner*—Milton O. Hirshfield
*Assistant Examiner*—R. Skudy
*Attorney*—L. Lee Humphries, H. Frederick Hamann and Edward Dugas

[57] ABSTRACT

An electrostatic support for supporting an electrically conductive member, for example, a spherically shaped gyroscope rotor.

A plurality of electrode pairs are positioned around the conductive member, with one electrode of a pair positioned opposite the other electrode of a pair. A periodic signal source provides a square wave reference signal. A pair of amplifiers are connected to the electrodes of a pair with each amplifier receiving the periodic signal as an input. A differential amplifier is connected across the pair of electrodes to provide an output signal proportional to the voltage difference between the electrodes and the supported conductive member. Switch means are provided for increasing or decreasing the gain of one amplifier while decreasing or increasing, respectively, the gain of the other amplifier in response to the difference signal so as to increase the magnitude of the periodic signal applied to one electrode and to decrease the magnitude of the periodic signal applied to the other electrode so as to coerce the electrically supported conductive member towards a centered position.

8 Claims, 11 Drawing Figures

INVENTOR.
JAMES L. ATKINSON

BY Edward Dugas
ATTORNEY

3,642,334

ELECTROSTATIC SUPPORT SYSTEM

BACKGROUND OF THE INVENTION

The present invention relates to an apparatus for electrostatically supporting an electrically conductive member in space and more particularly to a frictionless support means for supporting the rotor of a gyroscope while providing digital output signals which indicate the acceleration and displacement of the rotor with respect to the supporting electrodes.

An electrostatic gyroscope is a free-rotor gyroscope in which spherical bearing support forces are derived from an electric field. The rotor is generally an aluminum or beryllium sphere which may be either solid or hollow. The electrostatic support consists generally of pairs of spherical segment electrodes dispersed about the rotor. Prior known devices for electrically supporting a rotor of a gyroscope are disclosed, for example, in U.S. Pat. No. 3,098,679, issued July 23, 1963, entitled "Passive Control Circuit for Electrostatic Bearing," by W. F. DeBoice, and U.S. Pat. No. 2,919,583, issued Jan. 5, 1960, entitled "Magnetically Supported Gyroscope," by H. M. Parker. An additional patent of interest is U.S. Pat. No. 3,338,644, issued Aug. 29, 1967, entitled "Electrostatic Support Circuit," by J. L. Atkinson et al., which patent is assigned to North American Rockwell Corporation, the assignee of the present application.

The disadvantage of prior known levitation control systems which use, for example, AC voltage proportional control, is that transient terms are present as well as steady state terms and thus the instantaneous value of the AC voltages may be higher than the expected peak values. The resultant effect is to increase the field strength at the electrodes, and since the system is field strength limited, this factor must be taken into account in designing the system.

In U.S. Pat. No. 3,338,644, there is disclosed a hybrid system which pertains to a DC electrostatic support which derives position information utilizing an AC signal. Control is utilized to maintain the rotor at or near the desired center position over the complete range of g-loading for which it is designed, and to increase the theoretical maximum g-loading for a given allowable field strength and rotor mass. One of the main problems posed by the pure AC or the hybrid AC/DC-levitation system is the problem of separation or isolation of the control and sensing signals, which problem is common to every active levitation system in which the cavity electrodes provide the dual function of electrostatic forcing and position sensing. When sufficient separation of control and sensing signals is not accomplished, it is recognized that there is established an ulterior feedback loop which limits the maximum gain of the basic support loop electronics. It is in this particular manner that the fundamental rotor stiffness and dynamic response is limited or deteriorated. It would, therefore, be highly desirable to have a levitation system which results in an exceptionally small device exhibiting a digital position pickoff signal which is linearly proportional to rotor displacement along with a digital signal which is proportional to the acceleration forces acting on the rotor.

DESCRIPTION OF THE PREFERRED EMBODIMENT

Figure 1:
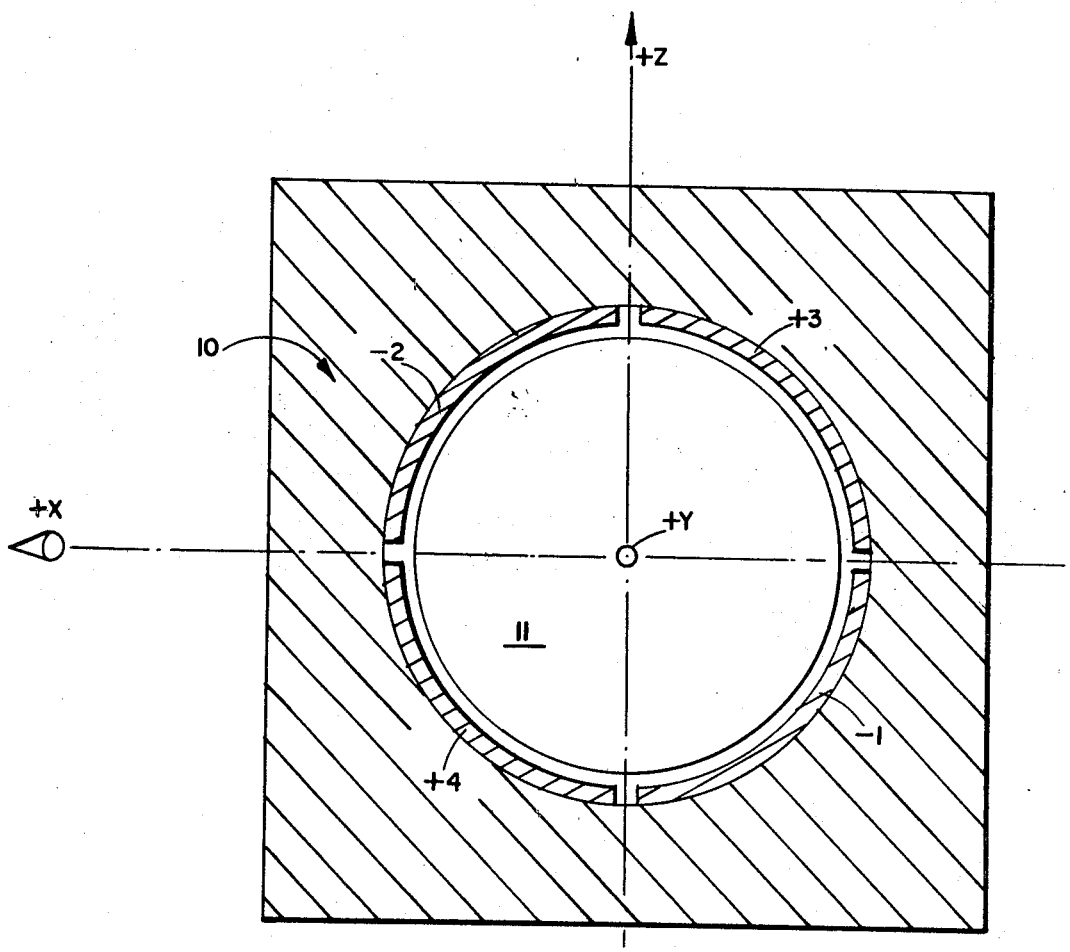
FIG. 1 illustrates in a sectioned view a sphere positioned for levitation by a plurality of electrodes.
Figure 2:
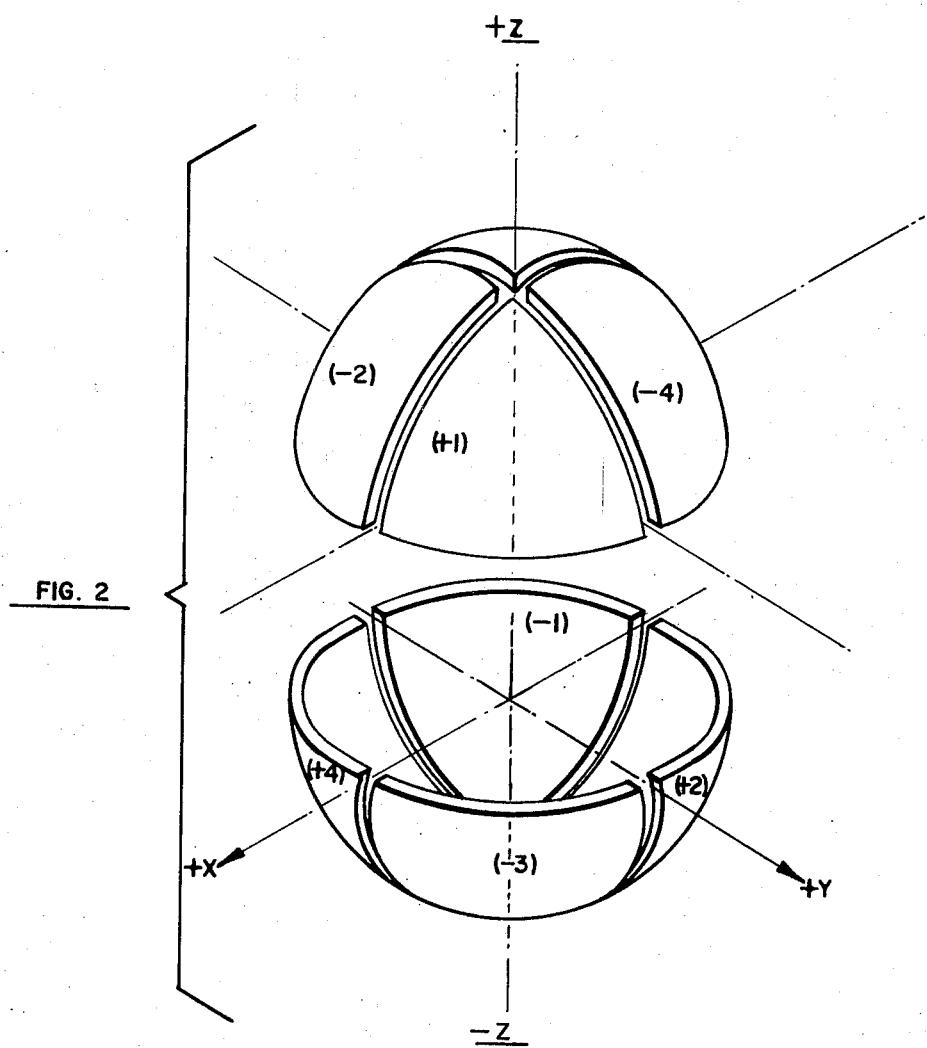
FIG. 2 illustrates in an exploded view the positioning and shape of the levitating electrodes used in the embodiment of the device shown in FIG. 1.

FIGS. 1 and 2 show schematically a gyroscope comprising a nonconducting ceramic case 10 with a spherical internal contour and an electrically conductive surfaced ball 11 which may or may not be spun as a rotor to act as a gyroscope. Within the case 10 is a spherical cavity 12, lined with eight octantal electrodes, shown, as seen from the outside, in FIG. 2, which are denoted for convenience in analysis as +1, −1, +2, −2, +3, −3, and +4, −4. Each pair, e.g., +1 and −1, are diametrically opposed. The electrode surfaces may be thought of as a projection upon a sphere of the eight faces of a regular octahedron. The axes of the electrode set are then taken as X, Y and Z in FIG. 2. The X- and Z-axes define the plane along which a section is taken for FIG. 1. A vacuum exists within the spherical cavity 12.

Each pair of electrodes, e.g., +1 and −1, are connected into a levitating servo means, to be described, such that the departure of the ball 11 from the center of the spherical cavity 12 which, for example, decreases the gap at +1 and increases it at −1, resulting in a voltage decrease and increase respectively to center the ball. It will be noted that four nonorthogonal levitation channels are provided, the angle between any pair of channels being approximately 110°.

Figure 3:
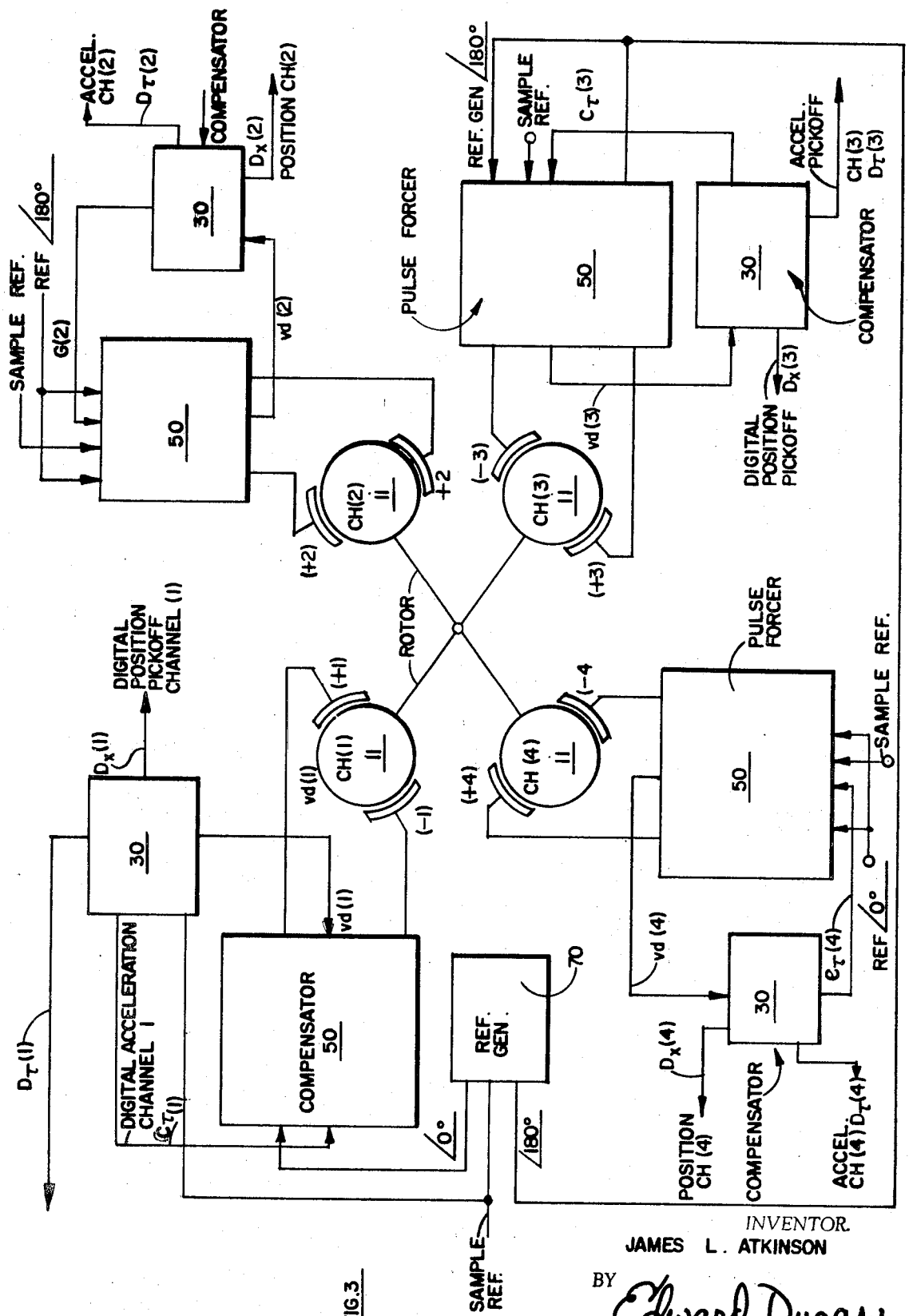
FIG. 3 is a block circuit diagram of the levitating electronics used in conjunction with the levitating electrodes of FIGS. 1 and 2.

Referring to FIG. 3 which shows all components of the levitation control system, the ball or rotor 11 appears schematically as four connected spheres, each with its associated opposing plate pairs (as illustrated in FIG. 2) with each plate pair defining channels one of four. The rotor 11 is shown as four segments to more clearly describe the electrical properties of the levitation circuits. Each channel of the levitation circuit is comprised of a compensator 30, a pulse forcer 50 and one common reference generator 70. The object of the levitation circuit is to provide stable electrostatic support of the rotor 11 to provide digital rotor position pickoff signals for each of the four sensing forcing axes, and to provide a digital acceleration pickoff signal for each of the four axes.

Figure 4:
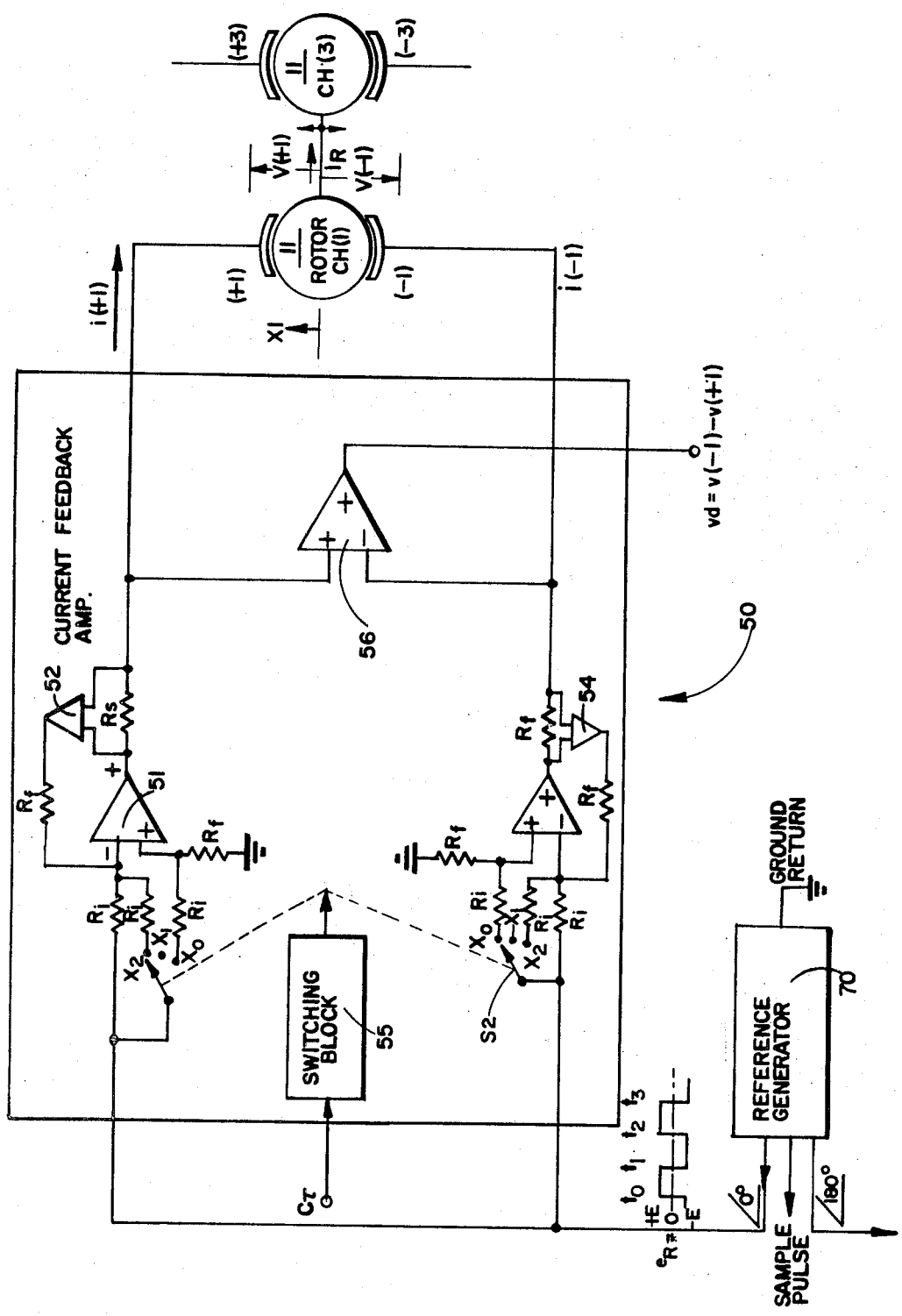
FIG. 4 is a block circuit schematic diagram of a pulse forcer used in the block diagram of FIG. 3.

Referring to FIG. 4 in conjunction with FIG. 3 which illustrates the configuration of the pulse forcer 50, the reference generator 70 has at its output a zero degree ($\angle 0°$) and a 180° ($\angle 180°$) square wave train of voltage pulses denoted $e_r(+)$ with amplitude E, both plus and minus, with respect to a ground return. The $\angle 0°$ reference line is fed to the mixing amplifiers 51 and 53 through input resistors $R_i$ (on both halves of the circuit). The circuit feedback amplifiers 52 and 54 detect the current output from amplifiers 51 and 53, respectively, through dropping resistors $R_f$. The output from each amplifier is fed back to the negative (−) input terminal of the mixing amplifiers 51 and 53.

Switches $S_1$ and $S_2$ are ganged together with their position on contacts $X_0$, $X_1$ or $X_2$ being controlled by the switching block 55. Switching block 55 receives as a control input the input designated $C_y$. Although mechanical switches are shown, in actuality, electronic switches are used. The plus (+) input of amplifiers 51 and 53 are connected to ground through resistors $R_f$ and to the terminal $X_0$ through resistors $R_i$. Terminal $X_1$ is left open on each switch. Terminal $X_2$ is connected to the negative input of amplifiers 51 and 53 through resistors $R_i$. A differential pickoff amplifier 56 receives the outputs from amplifiers 51 and 53 and provides an output $N_d$ which is proportional to the difference in the outputs from amplifiers 51 and 53. The output from amplifier 51 is also fed to the +1 electrode, with the output from amplifier 53 being fed to the −1 electrode.

The current feedback amplifiers 52 and 54, working in conjunction with the switch selectable input resistors $R_i$ and the mixing amplifiers 51 and 53 combine to form a device which produces a current $i(+1)$ and $i(-1)$ in the output circuit at electrodes +1 and −1, respectively, which is directly proportional to the voltage at the input of $R_i$. The proportionality constant is determined by the switch position. In the $X_0$ position, the gain constant is zero. In the middle position, $X_1$, it is unity and at the $X_2$ position, it is a factor of 2. The current leaving this "portion" of the rotor is $i_r$, where $$i_r = i(+1) + i(-1) \quad \text{Equation (1)}$$

With the switches $S_1$ and $S_2$ in the $X_1$ position:

$$i(+1) = i(-1) \quad \text{Equation (2)}$$

because the same source feeds both devices which have the same gain.

The reference generator 70 signal to the channel (3) pulse forcer 50 is a voltage of opposite sign, denoted $\angle 180°$, and of equal magnitude as compared to the reference voltage fed to the channel (1) pulse forcer. Therefore:

$$i(+3) = i(-3) = -i(+1) = -i(-1) \quad \text{Equation (3)}$$

thus; $i_R = [i(+3) + i(-3)]$  Equation (4)

The significance of this is that the current flowing out of the channel (1) electrodes is the same current flowing into the channel (3) electrodes. An identical arrangement exists for channels (2) and (4). The result is that the rotor is at ground potential. This condition will be maintained as long as $$i(+1) + i(-1) = i(+3) + i(-3) \quad \text{Equation (5)}$$

and $$i(+2) + i(-2) = i(+4) + i(-4) \quad \text{Equation (6)}$$

The voltage between the $(+1)$ electrode and the rotor is $V(+1)$. For the $(-1)$ electrode, it is $V(-1)$.

The displacement of the center of the rotor from the center of the cavity in the direction of the $(+1)$ electrode is designated X. The $(+1)$ electrode capacity is thus:

$$C(+1) = \frac{C_0}{1 - \frac{X}{g_0}} \quad (7)$$

and $$C(-1) = \frac{C_0}{1 + \frac{X}{g_0}} \quad (8)$$

Where $C_0$ is the nominal capacity with centered rotor
$g_0$ is the nominal gap with centered rotor, then $$V(+1) = \frac{1}{C_0}\left(1 - \frac{X}{g_0}\right)\int i(+1)\,dt \quad (9)$$

and $$V(-1) = \frac{1}{C_0}\left(1 + \frac{X}{g_0}\right)\int i(-1)\,dt \quad (10)$$

Similarly for all other channels.

The output of the differential pickoff amplifier 56 is $$V_d = V(-1) - V(+1) \quad \text{Equation (11)}$$

With the switches at position $X_1$:

$$V_d = \frac{2X}{C_0 g_0}\int i(+1)\,dt \quad (12)$$

since $i(+1) = i(-1)$

The value of $i(\pm 1)$ depends on the switch settings and some current/voltage transfer constant which can be defined as K a./volt.

$$i(+1) = \begin{cases} 2Ke_r(t) & \text{UP} & X_2 \\ Ke_r(t) & \text{MIDDLE} & X_1 \\ 0 & \text{DOWN} & X_0 \end{cases}$$

$$i(-1) = \begin{cases} 0 & \text{UP} & X_0 \\ Ke_r(t) & \text{MIDDLE} & X_1 \\ 2Ke_r(t) & \text{DOWN} & X_2 \end{cases} \quad (13)$$

Figure 6A:
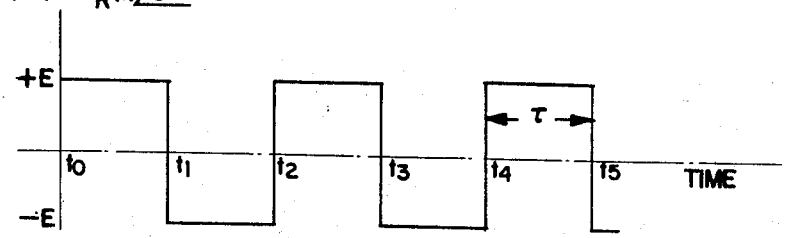
FIGS. 6a to 6f illustrate waveforms existing at various points in the circuits of FIGS. 3 and 4.

For the switches centered at X1

$$V_d = \frac{2K\int e_r(t)\,dt}{C_0 g_0} X \quad (14)$$

where $e_r(t)$ is shown in FIG. 6a

Figure 6B:
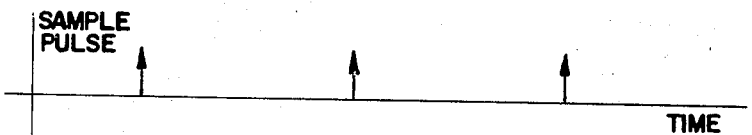
Figure 6C:
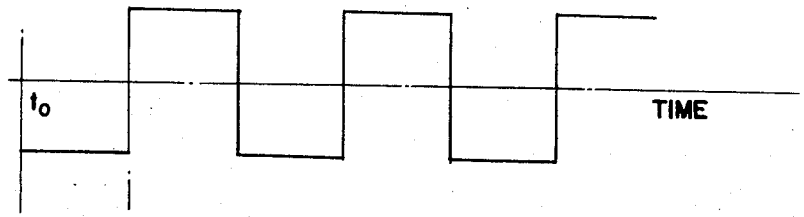
Figure 6D:
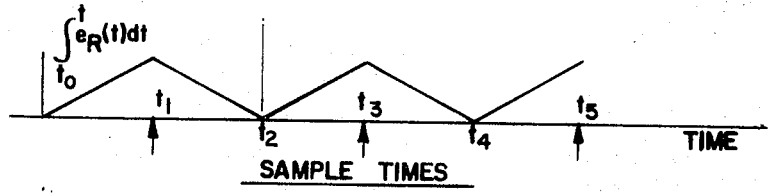

For zero initial conditions on the integral in Equation (14), if we start looking at $V_d$ at $t_0$ in FIG. 6d, it will increase until at time $t_1$;

$$V_d\Big|_{t_1} = \frac{2KE \int_{t_0}^{t_1} dt}{C_0 g_0} X = \frac{2KTE}{C_0 g_0} X \quad (15)$$

where T is one-half the period of reference, i.e., $T = t_1 - t_0$.

At time $T_2$, $V_d\big|_{t_2} = 0$, and will again be as in Equation (15) at $t_3$.

At $t_1$ time and every period thereafter, a pulse is generated by the reference generator 70; this pulse is called the sample pulse (FIG. 6b) since we wish to sample the pickoff voltage only at this time. Thus, with switches S1 and S2 in position $X_1$, at each sample time $V_d$ will be a voltage directly proportional to the rotor displacement X. Moving the switches to the UP position, that is S1 at $X_2$ and S2 at $X_0$, then:

$$i(+1) = 2Ke_r(t) \quad \text{Equation (16)}$$

and $$i(-1) = 0$$

according to Equation (13).

Hence, from Equations (9), (10), (11) and (13), $$V_d = \begin{cases} \dfrac{2K}{C_0}\left(1 - \dfrac{X}{g_0}\right)\int e_r(t)\,dt & \text{UP} \\[6pt] \dfrac{2KX}{C_0 g_0}\int e_r(t)\,dt & \text{MIDDLE} \\[6pt] \dfrac{2K}{C_0}\left(1 + \dfrac{X}{g_0}\right)\int e_r(t)\,dt & \text{DOWN} \end{cases} \quad (17)$$

According to Equation (13) no matter what the switch position;

$$i(+1) + i(-1) = 2Ke_r(t),$$

the relationship required to maintain the rotor at a ground potential.

Let the switches be away from center position for any time Y less than one one-half period T. For example, in FIG. 6e, the switches are UP for about T/3, during the first one-half period T and, again, the switches are UP for T/3 during the second one-half period. The symmetry is required so that the integral over 2T or one cycle of "forcing" is zero. The term "forcing" will be described later in more detail in the description.

Referring again to Equation (17), rewrite as $$V_d = \begin{cases} \dfrac{2KX}{C_0 g_0}\int e_r(t)\,dt - \dfrac{2K}{C_0}\int e_r(t)\,dt & \text{UP} \\[6pt] \dfrac{2KX}{C_0 g_0}\int e_r(t)\,dt & \text{MIDDLE} \\[6pt] \dfrac{2KX}{C_0 g_0}\int e_r(t)\,dt + \dfrac{2K}{C_0}\int e_r(t)\,dt & \text{DOWN} \end{cases} \quad (18)$$

The first term on each line, $$\frac{2KX}{C_0 g_0}\int e_r(t)\,dt,$$

is independent of switch position. This is the position information term. Since we are interested in the integral over $T = (t_0 - t_1)$, $$\frac{2KX}{C_0 g_0}\int_0^T e_r(t)\,dt = \frac{2KTE}{C_0 g_0} X \quad (19)$$

Now the second term in Equation (18) occurs during T and for a time Y.

Thus $$-\frac{2K}{+C_0}\int^\gamma e_r(t)dt = \frac{-2K\gamma E}{+C_0} \quad (20)$$

and, finally $$V_d = \begin{cases} \dfrac{2KTE}{C_0 g_0}X - \dfrac{2KE}{C_0}\gamma & \text{UP} \\[6pt] \dfrac{2KTE}{C_0 g_0}X & \text{MIDDLE} \\[6pt] \dfrac{2KTE}{C_0 g_0}X + \dfrac{2KE}{C_0}\gamma & \text{DOWN} \end{cases} \quad (21)$$

We will show next that Y is known and can thus be used to cancel the second term in Equation (21) so that $V_d$ is always (at the sample time) independent of the switch position during the one-half period, T, preceding the particular sample time. But first we will show that the electrostatic restoring force is proportional to Y.

The net electrostatic force is:

$$f_e = K_f[E(+1)^2 - E(-1)^2] \quad \text{Equation (22)}$$

where $E(+1)$ is the electric field strength in the gap between electrode $(+1)$ and rotor, $K_f$ is a proportionality constant.

Now $$E(+1) = \frac{V(+1)}{\text{gap}} = \frac{V(+1)}{g_0\left(1 - \dfrac{X}{g_0}\right)} \quad (23)$$

From Equation (19)

$$E(+1) = \frac{1}{C_0 g_0}\int i(+1)dt \quad (24)$$

Similarly $$E(-1) = \frac{1}{C_0 g_0}\int i(-1)dt \quad (25)$$

Therefore $$f_e = \frac{K_f}{C_0^2 g_0^2}\left[\left(\int i(+1)dt\right)^2 - \left(\int i(-1)dt\right)^2\right] \quad (26)$$

Figure 6E:
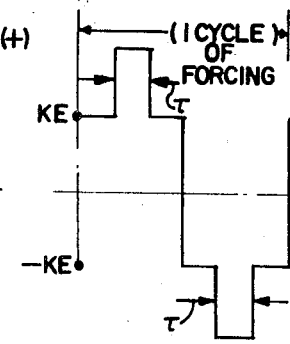

From FIGURE 6e $$\left(\int_{t_0}^{t_2} i(+1)dt\right)^2 = 2\left(\int_{t_0}^{t_1} i(+1)dt\right)^2$$

$$= 2(KTE + KE\gamma)^2 \quad (27)$$

Figure 6F:
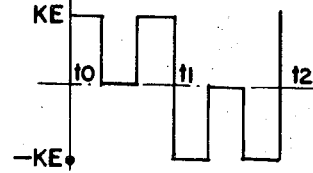

From FIGURE 6f $$\left(\int_{t_0}^{t_2} i(-1)dt\right)^2 = 2\left(\int_{t_0}^{t_1} i(-1)dt\right)^2$$

$$= 2(KTE - KE\gamma)^2 \quad (28)$$

thus $$f_e = \frac{K_f}{C_0^2 g_0^2} 8K^2 TE^2 \gamma \quad (29)$$

or $$f_e = K_t \gamma \quad (30)$$

where $K_t$ is a known constant depending on system parameters as $$K_t = \frac{8K_f}{C_0^2 g_0^2} K^2 TE^2 \quad (31)$$

Thus, net electrostatic restoring force during a forcing cycle $(t_0+t_2)$ is proportional to Y.

Since the rotor remains operationally suspended in substantially the center of the cavity due to restoring electrostatic forces, the average value of these electrostatic forces must equal the external accelerational forces acting on the rotor. Acceleration must then be proportional to the time duration of Y (shown in FIG. 6e).

Figure 5:
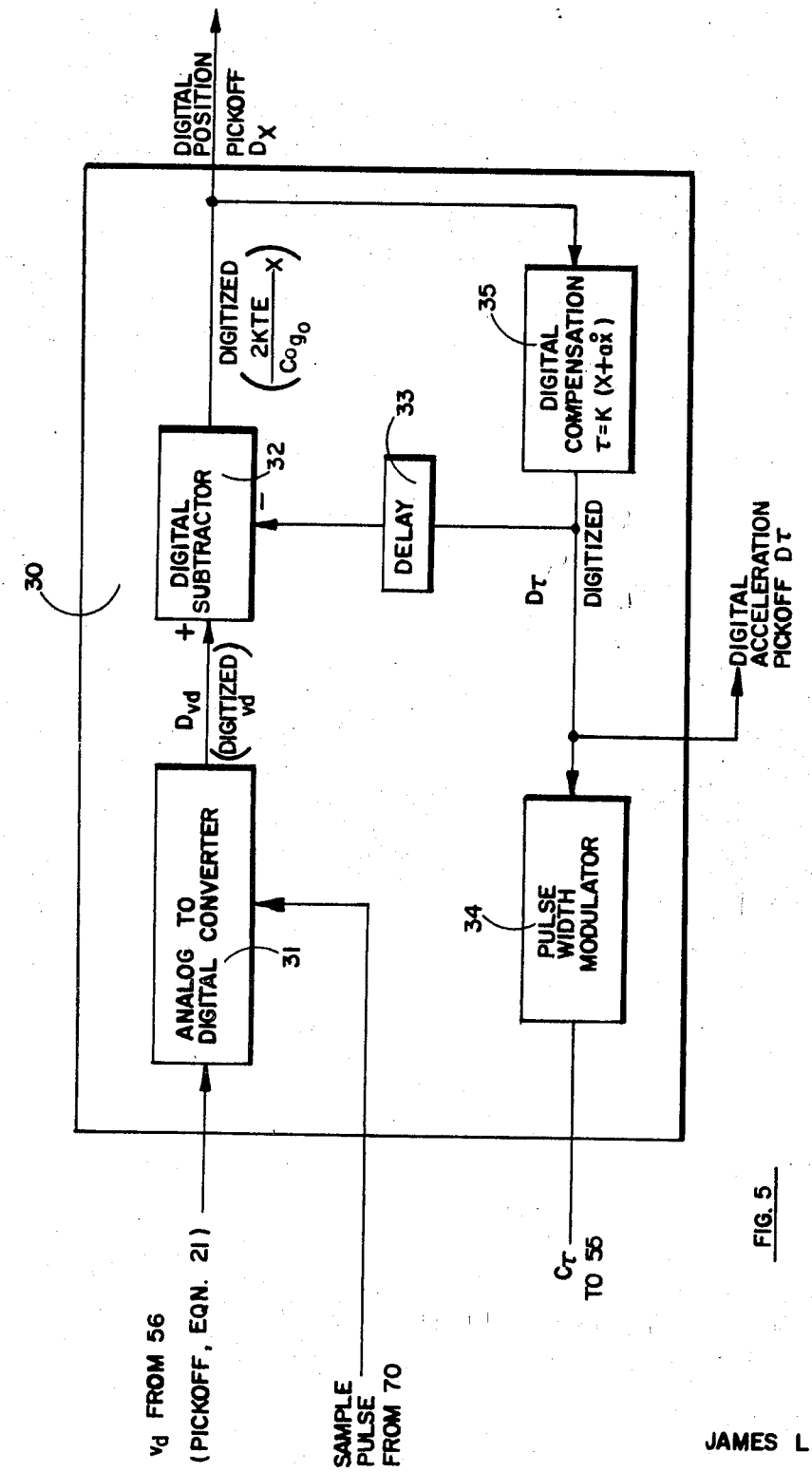
FIG. 5 is a block circuit schematic diagram of a compensator used in the block diagram of FIG. 3.

Referring to FIG. 5, the compensator 30 is shown comprised of an analog to digital converter 31 which receives the signal $V_d$ from differential pickoff amplifier 56 along with a sample pulse (shown in FIG. 6b) from the reference generator 70. The analog to digital converter 31 samples and holds the analog voltage $V_d$ at the sample pulse time and immediately converts the held voltage into a digital number $D_{vd}$. The number $D_{vd}$ is fed to a digital subtractor 32 in order that the term $D\gamma$, after passing through a delay 33, can be subtracted therefrom to provide the digital position pickoff signal $D_x$, which is the first term in $$\text{Equation (21) that is } D_x = \frac{2KTE}{C_0 g_0}X \quad (32)$$

The signal $D_x$ is fed back to a digital compensation circuit 35 which operates upon the signal $D_x$ to provide the output signal $D\gamma$ which is some linear combination of X, and $dx/dt$:

$$D_\gamma = \frac{2KE}{C_0}\gamma \quad (33)$$

The number $D\gamma$ contains information regarding direction of switch closure and closure duration. To change this number into a switch actuation signal, $C\gamma$, a pulse width modulator 34 is used. The pulse width modulator provides a square wave type output with the width of the pulses being proportional to the magnitude of the signal $D\gamma$.

Referring to FIG. 6e. Assume that some value for a required force level Y is known. The effect of Y is shown occuring between $t_0$ and $t_1$. At time $t_1$, $D_{vd}$ is measured. According to Equation (21), since Y is already known for this forcing cycle, it can be used to cancel out, in the digital subtractor 32, the second term. This cancellation then leaves the basic position pickoff term $D_x$. The known Y for this forcing cycle is stored in the digital delay element 33. Since a new $X$ is determined at time $t_1$, it is used in the digital compensation block 35 to generate a new Y which will be stored in the delay element 33, and which will also be used to establish the new controlled switch times for the $t_2-t_4$ forcing cycle. Thus the entire control loop is described since the action on all four channels is similar and independent as long as Equations (5) and (6) hold true.

While there has been disclosed what is considered to be the preferred embodiment of the invention, it will be manifest that many changes and modifications may be made therein without departing from the essential spirit of the invention.

SUMMARY OF THE INVENTION

The desired results are achieved in the present invention by providing an electrostatic support for supporting an electrically conductive member which support comprises at least one pair of electrodes arranged on opposite sides of the conductive member. A pair of amplifier means are connected to each pair of electrodes with one amplifier connected to one electrode of a pair and another amplifier connected to the other electrode of a pair with the amplifiers receiving a periodic signal, for example, a square wave signal, which signal is applied to opposite electrodes in the pair in an equal manner when the conductive member is centered between the electrodes. A differential sensing means is connected across the pair of electrodes to provide an output signal which is proportional to the voltage difference between the electrodes and the conductive member. A switching means is provided for increasing or decreasing the gain of one amplifier while decreasing or increasing, respectively, the gain of the other amplifier in response to the difference signal so as to increase the magnitude of the periodic signal applied to one electrode and to decrease the magnitude of the periodic signal applied to the other electrode so as to maintain the electrically supported conductive member substantially centered between the electrodes when the conductive member is influenced by external forces. A compensating means may be interposed between the output of the difference amplifier and the switching means to convert the difference signal into a digital signal. The digital signal is then compensated in order to provide a rotor position pickoff signal and a digital signal which is directly proportional to any acceleration force which acts to displace the electrically conductive member from the centered position. The compensation means provides the output signal to the switching means which output is proportional to the displacement of the conductive member from the centered reference position.

It is, therefore, an object of the present invention to provide an improved electrostatic support circuit.

It is a further object of the present invention to provide an electrostatic support circuit which utilizes digital techniques.

It is still another object of the present invention to provide an electrostatic support circuit for maintaining an electrically conductive member at or near a desired centered position between supporting electrodes while providing an output signal indicative of the position of the conductive member with respect to the electrodes.

It is another object of the present invention to provide a highly efficient digital electrostatic control system for supporting an electrically conductive member.

These and further objects of the present invention will become more apparent from the following description when taken in conjunction with the accompanying drawings in which like characters indicate like parts and which drawings form a part of the present invention.

I claim:

1. An electrostatic support for supporting an electrically conductive member comprising:
   a. a source of periodic signal, said signal alternating about a reference potential;
   b. a plurality of electrode pairs positioned around said conductive member;
   c. a pair of amplifier means connected to each pair of electrodes with one amplifier connected to one electrode of a pair and the other amplifier connected to the other electrode of a pair, for receiving said periodic signal and applying said signal to opposite electrodes in a pair;
   d. differential amplifier means connected across said pair of electrodes to provide an output signal proportional to the voltage difference between said electrodes and the conductive member; and
   e. switch means for increasing or decreasing the gain of one amplifier while decreasing or increasing, respectively, the gain of the other amplifier in response to said difference signal so as to increase the magnitude of said periodic signal applied to one electrode and to decrease the magnitude of said periodic signal applied to the other electrode, so as to recenter the electrically supported conductive member.

2. The invention according to claim 1 wherein said source of periodic signal provides at least two reference signals shifted in phase by 180°, and wherein one reference signal is applied to one pair of amplifier means and its associated pair of electrodes and the other reference signal is applied to the pair of amplifier means connected to the pair of electrodes positioned opposite the first named electrode pair so as to maintain the potential of said supported conductive member at said reference potential.

3. The invention according to claim 1 wherein each of said amplifying means is comprised of:
   a. a first amplifier having an input connected to receive said reference signal;
   b. a current feedback means coupling the output of said first amplifier back to the input of said first amplifier; and
   c. wherein said switch means includes a selectable impedance means connected to the input of said first amplifier to change the gain of said first amplifier.

4. The invention according to claim 1 and further comprising:
   compensation means receiving the output from said differential amplifier means and for converting said output into a proportional digital signal, which signal is applied to said switch means to control the state thereof.

5. The invention according to claim 4 wherein said compensation means is comprised of:
   a. an analog to digital converter for converting the output from said digital amplifier means into a first digital signal;
   b. subtract means receiving said first digital signal and a corrected digital signal and providing a digital output equal to the difference in the digital signals, with said digital output signal being proportional to the position of said supported conductive member with respect to said electrodes;
   c. digital compensation means receiving said output digital signal and operating upon said output signal to provide a second output signal proportional to the acceleration acting on said supported conductive member;
   d. delay means for receiving as an input said second output signal and for delaying said second output signal and providing as its output said corrected digital signal which is fed to said subtract means; and
   e. pulse width modulator means for receiving said second output signal and for providing a modulated signal to said switch means for controlling the switching rate of said switch means in response to said second output signal.

6. An electrostatic support device for supporting an electrically conductive member in space, comprising:
   a. a plurality of electrode pairs positioned around said electrically conductive member;
   b. a source of a periodic reference signal;
   c. amplifier means connected between said periodic reference signal source and said pairs of electrodes for controllably amplifying said periodic reference signal and applying a positive reference signal to one plate and an equal negative reference signal to the other plate of a pair when the conductive member is centered between the electrodes of a pair;
   d. means for sensing the difference in potential between said electrodes of a pair and said conductive member and for converting the detected potential difference into a control signal; and
   e. switching means responsive to said control signal for increasing the gain of said amplifier means as applied to one reference signal while decreasing the gain of said amplifier means as applied to the other reference signal so as to increase the electrostatic force applied to one electrode and decrease the force applied to the other electrode of an electrode pair so as to center the conductive member between the electrode pair.

7. The invention according to claim 6 and further comprising:
   compensating means interposed between said difference sensing means and said switching means for receiving said control signal and for removing portions of said control signal to provide a pulse width modulated signal to said switching means which signal is proportional to the displacement of said conductive members with respect to said electrode paid.

8. A support apparatus for maintaining an electrically conductive member supported in space comprising at least one pair of electrodes arranged on opposite sides of said conductive member;
   a. a square wave signal source for providing a signal having an equal amplitude on either side of a reference amplitude and a constant pulse width;
   b. a first amplifier for receiving said square wave signal and for applying said signal to one electrode of said pair of electrodes;

c. a second amplifier for receiving said square wave signal and for applying said signal to the other electrode of said pair of electrodes;
d. first means for adjusting the gain on said first amplifier;
e. second means for adjusting the gain on said second amplifier;
f. potential difference means for detecting the difference in potential between one of the electrodes of said pair and said conductive member, and the other electrode of said pair and said conductive member so as to provide a signal indicative of the position of said conductive member with respect to said electrodes; and
g. switch means responsive to the provided position signal for controlling said first and said second means so as to increase the gain of the amplifier connected to the electrode furtherest from said conductive member and to decrease the gain of the amplifier connected to the electrode closest to said supported conductive member so as to restore said conductive member to a substantially centered position between said electrodes.

* * * * *